Patented Apr. 29, 1952

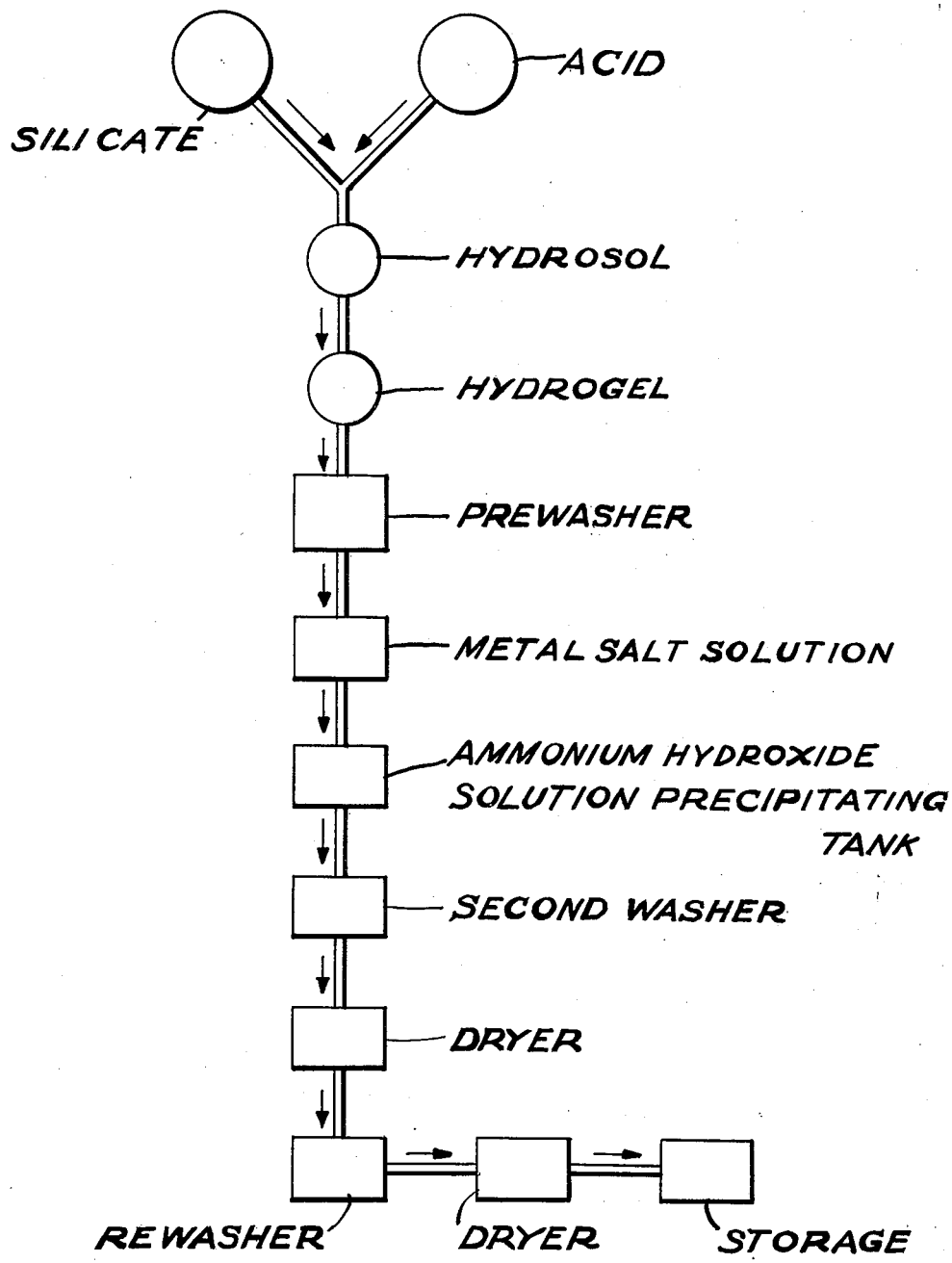

2,595,056

UNITED STATES PATENT OFFICE 2,595,056

PREPARATION OF A SILICA-METAL OXIDE GEL CATALYST

Gerald C. Connolly, Baltimore, Md., assignor to Standard Oil Development Company, a corporation of Delaware Application January 27, 1949, Serial No. 73,153

5 Claims. (Cl. 252—455)

1

This invention relates to the preparation of synthetic gels and pertains more particularly to the preparation of silica gels containing metal oxides adapted for the conversion of hydrocarbon oils.

It is now generally known that synthetic gels composed of silica and other metal oxides, such as magnesia, zirconia and alumina, are particularly suitable for cracking hydrocarbon oils to form motor fuels in that such gels are capable of giving a motor fuel of higher quality with less gas loss than can be obtained by thermal cracking. It has also been found that such catalysts are particularly effective for stabilizing olefinic gasoline in the production of aviation motor fuel. During the stabilization treatment the olefinic constituents of the gasoline are converted into aromatics or are otherwise removed or transformed.

It is also commonly known that the presence of certain impurities, particularly the alkali metals, have an extremely harmful effect on the activity and regenerative life of these types of catalysts. For example, the specifications for catalysts of this type employed for the conversion of hydrocarbon oils usually contain the requirement that the sodium oxide content be below 0.2%. The chief source of contamination of the catalyst with sodium compounds is normally from the silica, since this product is prepared from sodium silicate. It has also been found, however, that certain of the commercial grade aluminum salts contain a substantial amount of sodium impurities. For example, it has been found that even after the silica has been thoroughly purified to remove substantially all of the sodium the final silica-alumina catalyst may contain a substantial amount of sodium compounds resulting from the contamination of the aluminum salt used in the preparation of the catalyst.

One of the principal methods of producing aluminum sulfate, for example, is to react sulfuric acid with an aluminum hydrate which in turn is produced by the precipitation of aluminum hydroxide or hydrate from the sodium aluminate solution.

One convenient and effective method of producing silica-alumina catalysts is to first prepare a purified hydrous oxide of silica such as silica hydrogel and then impregnate or soak the hydrogel so formed with an aluminum salt solution, such as aluminum sulfate, followed by precipitation of the aluminum hydroxide from the aluminum salt by ammonia or other volatile base. According to conventional practices, an excess of the volatile base is normally used in order to insure complete precipitation of the aluminum salt.

My invention finds particular application in the preparation of a silica-alumina catalyst according to the general procedure above outlined.

One of the principal objects of the present invention is to provide a more simple and economical method of producing the silica-alumina catalyst which will be substantially free of alkali metal impurities even though obtained from relatively impure starting materials.

Another more specific object of the invention is to provide a simple and economical method of preparing a synthetic catalyst subject to more effective control to produce a product substantially free of alkali metal ions.

Other more specific objects and advantages of the invention will be apparent from the detailed description hereinafter in which reference will be made to the accompanying drawing which is a schematic flow diagram illustrating the various steps making up my invention.

One of the important characteristics of my invention is that the catalyst is prepared in its entirety in a slightly acid medium. This facilitates the washing treatment and prevents the possibility of forming zeolitic structures in which the sodium becomes associated with the silica and alumina and cannot be completely removed by simple water washing.

For example, following the addition of aluminum salt to the silica hydrogel, ammonia or other volatile precipitating agent is added to precipitate the alumina present in the salt, the amount of precipitant added being preferably from about 85 to 95% of that necessary for complete neutralization of the aluminum salt. As a result of the partial neutralization, the gel is prevented from passing to the alkaline side and the subsequent washing is accomplished more easily.

Another important characteristic of my invention is that the catalyst is given a final washing treatment subsequent to an initial drying operation. This final washing treatment requires only a small amount of water as compared with the earlier washing treatment, since any small quantities of impurities remaining are more concentrated in the dried product. Furthermore, the final washing of the dried product serves to correct inequalities or faults which may arise in the earlier stages of preparation. For example, it will tend to correct and remove impurities which are incompletely removed during the initial washing of the silica hydrogel.

The preparation of the catalyst according to my invention may be better understood by reference to the flow sheet on the accompanying drawing. Referring to the drawing, a solution of sodium silicate and a solution of sulfuric acid are first thoroughly reacted under conditions preferably controlled to form a relatively clear hydrosol. For example, one very satisfactory method is to react equal volumes of 25° Bé. sodium silicate and 21.5 to 23° Bé. sulfuric acid under such conditions that the mixture throughout will at all times contain excess acid. This may be done by adding the silicate solution to the acid or, preferably, running the two streams together. In either case, vigorous agitation should be used to avoid even a very local excess of the silicate. A relatively clear hydrosol will be formed which at a temperature of 70°–80° F. will set to a firm hydrogel in 3 to 5 hours. Under the conditions mentioned and using a commercial sodium silicate having a mol ratio of $SiO_2$ to $Na_2O$ of 3.25 to 1 or somewhat higher, the excess acidity will be from one to two normal. After the hydrogel has been allowed to set until syneresis has fully developed, it is broken into coarse lumps and then subjected to simple washing treatment until the product is substantially free of sodium. During this washing treatment the sodium content calculated as sodium oxide may be reduced to below about 0.2%.

The washed and purified silica hydrogel is next soaked in an aluminum salt solution, such as a hydrated aluminum sulfate, until the hydrogel is thoroughly impregnated with the aluminum salt. The concentration of the aluminum salt is made up to deposit the required amount of alumina on the catalyst. For the conversion of hydrocarbon oils it is preferred to prepare a catalyst containing from 10% to 20% of alumina and preferably between 12% and 14%. It is normally necessary to employ an amount of aluminum salt in excess of that to be deposited on that catalyst since, after the salt has diffused into the hydrogel and equilibrium established, a certain portion of the salt will be drained or removed from the gel following the impregnation or soaking period. Draining of the excess solution from the hydrogel is essential in order to avoid the precipitation of hydrated alumina separately from, i. e. not in direct association with the silica hydrogel.

After the silica hydrogel has been thoroughly impregnated with the aluminum salt solution, the excess solution is drained from the hydrogel and the impregnated gel is then treated with an ammoniacal solution to precipitate the alumina from the salt.

According to one of the important phases of the present invention, the amount of ammonia employed for effecting the precipitation is only from 85% to 95% of that theoretically required to precipitate all of the aluminum salt present in the solution. As a result, some of the aluminum salt will remain as such as the solution will remain slightly acid or at least will not become alkaline. Furthermore, any sodium salts contained as impurities in the aluminum salt will not be converted to the sodium hydroxide or the equivalent which might subsequently become associated with the silica and alumina to form a zeolitic complex from which the sodium could not be removed by simple washing treatment.

Following the precipitation of the alumina from the aluminum salt solution onto and within the silica hydrogel, the product is again subjected to thorough washing, preferably with acidulated water having a pH value of about 4, because of this pH no aluminum is lost by dissolving, as would occur if water having a lower pH were used.

It has been noted that even though the silica hydrogel has been purified to such a point that the sodium content is below 0.2% the product following precipitation of the alumina from the aluminum salt may have a sodium content above this value which would be objectionable. When an excess of ammonium hydroxide is used to precipitate the alumina on and within the gel structure, the basic condition of the gel will cause difficulty in removing the soda during the washing following the chemical decomposition. For this reason, it is desirable to neutralize the aluminum sulfate incompletely with the ammonia solution.

Following the initial washing of the silica-alumina composite, the product is given an initial drying treatment sufficient to remove from 70% to 90% of the free water and to shrink the structure about one-sixth its former volume. It will be understood that prior to this drying treatment the gel may contain as high as 90% or more of water and only 10% or less of solid material. Following the initial drying treatment the product is subjected to its final washing treatment. This final washing treatment serves to reduce further the amount of sodium which may be contained in the product and also serves to remove or correct any deficiencies arising during the earlier treating steps.

For example, if during the preparation of the catalyst the power is cut off for a certain time the amount of washing previously given may be less than that prescribed. If so, the final washing treatment will serve as a corrective measure to insure that the final product will contain the minimum amount of sodium oxide. Following the final washing, the product is subjected to final drying treatment and may be reactivated by slowly heating to a temperature of from about 600° F. to the temperature at which the catalyst is to be employed.

While for illustrative purposes the flow sheet shows the steps being carried out in separate and independent equipment, it will be understood that the product may be prepared in a simple tank or the various steps may be carried out in separate equipment as illustrated.

In the description, reference has been made to the use of sulfuric acid for reacting with the sodium silicate. It will be understood that other acids may be used in lieu of sulfuric acid. Also, while aluminum sulfate has been employed as the aluminum salt in the preparation of the catalyst, other aluminum salts, such as aluminum nitrate or aluminum chloride, may be utilized. In the former case, the aluminum nitrate may be decomposed into alumina by heating rather than by treating with the ammonium hydroxide. Furthermore, in lieu of ammonium hydroxide other volatile bases, such as ammonium carbonate, ammonium sulfide, or the like may be used.

The method has been outlined embracing only the manufacture of silica-alumina catalysts. However, the method, or some very slight modification of the same, is applicable to other two-component adsorbent catalysts as, for example, silica-magnesia, silica-zirconia, silica-thoria, silica-beryllia, etc., or three-component catalysts such as silica-alumina-beryllia, silica-alumina-zirconia, silica-magnesia-alumina, etc. to mention a few. Furthermore, it is applicable to catalysts for other than the cracking reaction, for example, dehydrogenation, reforming, isomerization, polymerization, hydrogenation, or, in fact, for any silica gel base catalysts having the most essential properties of high activity and long regenerative life.

Having described the preferred embodiment of the invention, it will be understood that it embraces such other variations and modifications as come within the spirit and scope thereof. This application is a continuation-in-part of application Serial No. 514,752, filed December 18, 1943, now abandoned.

What is claimed is:

1. A process for preparing a synthetic gel comprising silica and a metal oxide which comprises forming a substantially pure silica hydrogel, soaking said hydrogel in a metallic salt solution until the hydrogel is thoroughly impregnated with metallic salt solution, thereafter draining excess salt solution from the hydrogel, treating the impregnated hydrogel with a volatile base in an amount insufficient to react completely with all of said salt but sufficient to react with a major portion of said salt whereby said gel remains acid, washing the resulting product and drying the resulting washed product.

2. A process for preparing a synthetic gel comprising essentially silica and alumina which comprises forming a substantially pure silica hydrogel, soaking said hydrogel in an aluminum salt solution until the hydrogel is thoroughly impregnated with said solution, thereafter draining excess salt solution from said hydrogen, treating the impregnated hydrogel with a volatile base in an amount insufficient to react completely with all of the aluminum salt contained in said hydrogel but sufficient to react with a major portion of said aluminum salt whereby said gel remains acid, washing the resulting product to remove reaction impurities and drying the washed product.

3. A process for preparing a synthetic gel containing silica and alumina which comprises first forming a silica hydrogel substantially free of alkali metal, soaking said hydrogel in an aluminum salt solution until the hydrogel is thoroughly impregnated with said solution, thereafter draining the excess salt solution from said hydrogel, treating the impregnated hydrogel with a volatile base in an amount insufficient to react completely with said aluminum salt but using at least 85% of the theoretical amount of volatile base necessary to precipitate all of the aluminum salt whereby the resulting hydrogel remains acid, washing the resulting product to remove reaction impurities therefrom, subjecting the washed product to an initial drying treatment to remove a major portion of the water from said gel, thereafter subjecting the gel to a second washing treatment, and thereafter subjecting the washed gel to final drying treatment.

4. In the process defined by claim 2, the further improvement which comprises employing from 85 to 95% of the theoretical amount of volatile base necessary to precipitate all of the aluminum salt.

5. In the process defined by claim 2, the further improvement which comprises employing an ammoniacal solution as the volatile base for reacting with said aluminum salt.

GERALD C. CONNOLLY.

REFERENCES CITED

The following references are of record in the file of this patent:

UNITED STATES PATENTS

| Number | Name | Date |
| --- | --- | --- |
| 1,797,804 | Stoewener | Mar. 24, 1931 |
| 1,798,766 | Stoewener | Mar. 31, 1931 |
| 2,036,258 | Cummins | Apr. 7, 1936 |
| 2,257,157 | Connolly | Sept. 30, 1941 |
| 2,270,090 | Thomas | Jan. 13, 1942 |
| 2,272,301 | Kinneberg et al. | Feb. 10, 1942 |
| 2,285,314 | Thomas et al. | June 2, 1942 |
| 2,371,087 | Webb et al. | Mar. 6, 1945 |
| 2,395,153 | Thomas et al. | Feb. 19, 1946 |
| 2,462,236 | Thomas | Feb. 22, 1949 |
| 2,469,314 | Ryland | May 3, 1949 |